(12) United States Patent
Henriksen, Jr.

(10) Patent No.: US 8,770,904 B2
(45) Date of Patent: Jul. 8, 2014

(54) COMPOSITE NON-WOOD FLOORING THREADED FASTENER

(71) Applicant: Engineered Components Co., Elgin, IL (US)

(72) Inventor: Arne Henriksen, Jr., Algonquin, IL (US)

(73) Assignee: Engineered Components Company, Elgin, IL (US)

( * ) Notice: Subject to any disclaimer, the term of this patent is extended or adjusted under 35 U.S.C. 154(b) by 0 days.

(21) Appl. No.: 13/657,514

(22) Filed: Oct. 22, 2012

(65) Prior Publication Data

US 2014/0112733 A1    Apr. 24, 2014

(51) Int. Cl.
*F16B 35/06* (2006.01)

(52) U.S. Cl.
USPC .......................................... 411/399; 411/408

(58) Field of Classification Search
USPC ........... 411/82, 82.2, 82.3, 387.1, 387.6, 399, 411/402, 408, 914
See application file for complete search history.

(56) References Cited

U.S. PATENT DOCUMENTS

| | | | | |
|---|---|---|---|---|
| 2,056,688 | A * | 10/1936 | Peterka et al. | 411/399 |
| 3,061,455 | A * | 10/1962 | Anthony | 411/258 |
| 5,193,958 | A * | 3/1993 | Day | 411/82 |
| 5,275,601 | A * | 1/1994 | Gogolewski et al. | 606/291 |
| 5,304,023 | A * | 4/1994 | Toback et al. | 411/387.3 |
| 5,964,560 | A | 10/1999 | Henriksen | |
| 7,195,437 | B2 * | 3/2007 | Sakamoto | 411/82.3 |
| 7,690,167 | B2 * | 4/2010 | Antonic | 52/481.1 |
| 7,950,885 | B2 * | 5/2011 | Rosenkranz | 411/82.2 |
| 2001/0051080 | A1 * | 12/2001 | Godsted et al. | 411/82.2 |
| 2004/0208726 | A1 * | 10/2004 | Bohme et al. | 411/411 |
| 2005/0063796 | A1 * | 3/2005 | Dicke | 411/399 |
| 2010/0158634 | A1 * | 6/2010 | Walther | 411/399 |
| 2012/0251264 | A1 * | 10/2012 | Taylor | 411/190 |

* cited by examiner

*Primary Examiner* — Roberta Delisle
(74) *Attorney, Agent, or Firm* — Greer, Burns & Crain Ltd.

(57) ABSTRACT

A threaded fastener including a shank extending along an axis away from an enlarged head to a tip. A thread extends in a helix around the shank from the tip of the shank towards the enlarged head. A driving recess on a top surface of the enlarged head receives a tool for driving the fastener in a rotational manner around the axis of the shank. Cutter teeth are formed on a lower surface of the enlarged head. The fastener may be assembled with a hard composite non-wood material decking and a supporting metal I-beam.

10 Claims, 4 Drawing Sheets

COMPOSITE NON-WOOD FLOORING THREADED FASTENER

BACKGROUND OF THE INVENTION

The present invention relates to a threaded fastener, and in particular to a threaded fastener that is useful with composite non-wood flooring for use in a truck body where the flooring is supported on steel I-beams.

Threaded fasteners generally include a threaded shank and an enlarged head that has an accommodation for a tool. Threaded fasteners are known that have self-drilling tips to allow the fastener to make or enlarge its own hole, or axial ridges to prevent unwanted rotation of the fastener once it is advanced to its desired position.

In the construction of the floors of truck bodies, particularly semi-trailers which carry substantial loads, such as on the order of 25,000 pounds, the material used for the floors typically has been oak or other hardwoods which are capable of supporting such heavy loads. These wood floors are secured to steel I-beams of the truck frame with flat head threaded fasteners which are driven into the wood floors and which fasteners countersink themselves into the surface of the wood flooring so as to provide a flush surface between the wood and the upper surface of the fastener head. Although oak and other hardwoods are relatively hard, the screws nevertheless are capable of being driven into the surface of these woods in a countersunk manner to provide this flush surface. Having a flush surface is important so that loads carried in the truck body, which may be slid into place, or portions of equipment, such as fork lift truck forks, do not scrape against protruding heads of the fasteners, which could sever the protruding fastener heads, or could damage the loads or equipment.

Recently, due to a shortage of oak and other hardwoods, such as Apatong, rendering them more costly than previously, a composite non-wood material has been developed for truck floor decking which has the strength and stiffness to support the heavy loads and traffic associated with floors in semi-truck trailers. A particular flooring material is called EKO-FLOR by Conforce International, Inc. The composite material that has been developed is composed of fiber reinforcements and a resin material that have a hardness surpassing wood and little resiliency or compressibility. Another advantage of the composite decking is its relatively lighter weight, as compared to hardwoods, which translates into a weight savings of 500 pounds in an average semi-truck trailer. This weight advantage allows a trucker to load more cargo into a truck, while still maintaining a maximum load, or transporting a lighter weight when carrying an equivalent load, thereby saving fuel.

While this composite material is sufficiently strong to support the necessary loads, its increased hardness, as compared to wood, prevents standard threaded fasteners from being capable of countersinking themselves into the surface of the composite material because the composite material has relatively no give or compressibility. This means that the heads of the fasteners may remain elevated above the surface of the composite material after the fastener is fully engaged with the composite decking material in a manner and to a degree that is unacceptable.

To assemble and fasten the floor decking into the semi-truck trailer, the decking is laid on supporting steel I-beams that have pilot holes pre-drilled into the flanges of the I-beams. Because of the hardness of the cold rolled steel I-beams, the drill bits used to make the pilot holes have to be changed with some frequency, even when the bits are made of very hard materials, since they are each required to drill several holes through the I-beams.

It therefore would be an improvement if there were provided a fastener that could be driven into the composite non-wood material and would countersink itself so that a top surface of the head of the fastener would not be elevated above the surface of the composite non-wood material.

It would also be an improvement if there were provided a fastener that could be driven into the composite non-wood material and into the supporting steel I-beam, without requiring a pilot hole to be provided in the steel I-beam.

SUMMARY OF THE INVENTION

In an embodiment, the present invention provides a threaded fastener that is configured such that it can be driven into a hard composite non-wood material. The fastener will countersink itself so that a top surface of the head of the fastener will not remain elevated above the surface of the composite non-wood material when the fastener is fully engaged with the decking material.

In an embodiment, the threaded fastener includes a shank extending along an axis away from an enlarged head to a tip, a thread extending in a helix around the shank from the tip of the shank towards the enlarged head, a driving recess on a top surface of the enlarged head for receiving a tool for driving the fastener in a rotational manner around the axis of the shank, and cutter teeth formed on a lower surface of the enlarged head.

In an embodiment, the cutter teeth each comprise a ridge extending radially outwardly from the shank to a peripheral edge of the enlarged head.

In an embodiment, the thread is arranged on the shank so that the fastener is advanced upon a rotation of the fastener around the axis in a first rotational direction and each ridge comprises two side walls angled relative to the axis and meeting at an apex, the apex leading the two side walls in the rotational direction of advance of the fastener.

In an embodiment, a first of each of the two side walls is on a leading side as compared to a second of the two side walls, the first, leading side wall of each ridge being angled from the axial direction less than the second side wall.

In an embodiment, a radial groove is positioned between each of the ridges, the groove having a greater depth at the peripheral edge of the enlarged head than at the shank.

In an embodiment, a circumferential slot is formed in the shank between an end of the thread and the enlarged head.

In an embodiment, a nylon lock patch is applied to a surface of the fastener, at least in an area of the thread which will remain in engagement with the composite material.

In an embodiment, a silicone based wax or other heavy wax is applied to a surface of the fastener, at least in an area of the thread.

In an embodiment, an axial groove is provided at the tip of the fastener shank to provide a self-drilling tip.

In an embodiment, the present invention provides an assembly of a threaded fastener with a hard composite non-wood material decking and a supporting metal I-beam. The fastener is configured such that it can be driven into the hard composite non-wood material. The fastener will countersink itself so that a top surface of the head of the fastener will not remain elevated above the surface of the composite non-wood material when the fastener is fully engaged with the decking material.

In an embodiment, an axial groove is provided at the tip of the fastener shank to provide a self-drilling tip, such that the fastener is capable of drilling a hole into the metal I-beam.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DETAILED DESCRIPTION OF THE PREFERRED EMBODIMENTS

Figure 1:
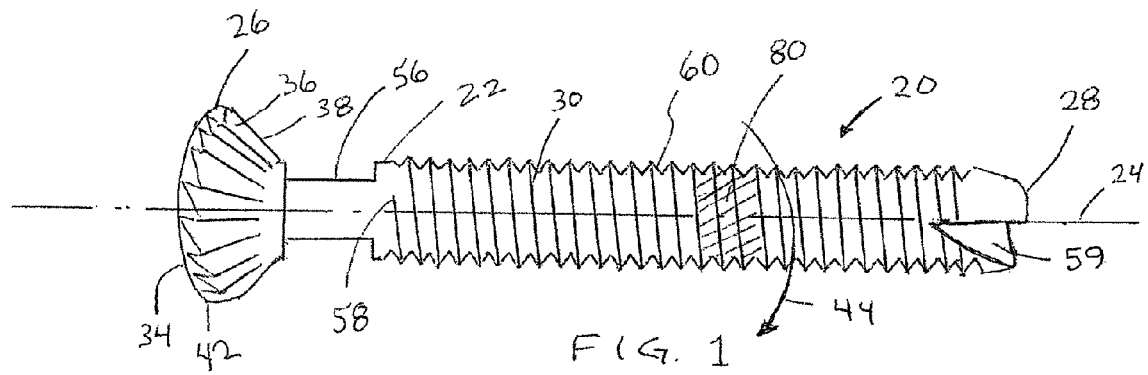
FIG. 1 is a side-elevational view of a threaded fastener embodying the principles of the present invention.
Figure 2:
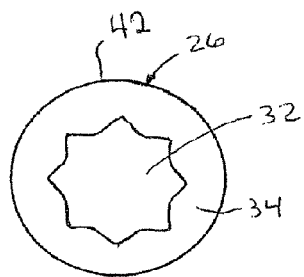
FIG. 2 is an end elevational view of the head of the fastener of FIG. 1.

FIG. 1 illustrates a threaded fastener 20 which includes a shank 22 extending along an axis 24 away from an enlarged head 26 to a tip 28. A thread 30 extends in a helix around the shank 22 from the tip 28 towards the enlarged head 26. A driving recess 32 (FIG. 2) on a top surface 34 of the enlarged head 26 is provided for receiving a tool for driving the fastener 20 in a rotational manner around the axis 24 of the shank 22. The recess 32 may be a simple slot, a cross-shaped recess used with Phillips drivers, or a more complex recess such as hexagonally shaped or star shaped as used by hexagonal drivers, Torx® drivers and other well known threaded fastener drivers. Cutter teeth 36 are formed on a lower surface 38 of the enlarged head 26.

In a standard flat head threaded fastener where the threaded shank 22 has a diameter of 5/16 inches, the head diameter is 0.625 inches. However, in an embodiment of the invention, it has been found that the diameter of the head can be reduced to between 0.570 and 0.590 inches which reduces the amount of composite material 72 that must be removed to allow for a flush seating of the head 26 as discussed in more detail below.

Figure 5:
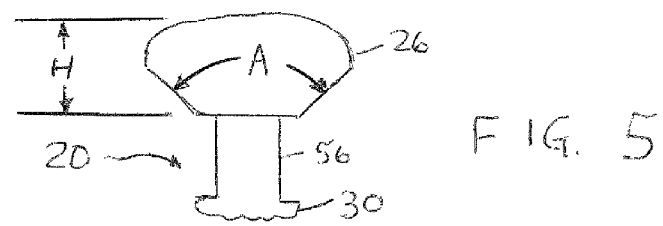
FIG. 5 is a partial side elevational view of the fastener head.

In a standard flat head threaded fastener, the underside of the head is typically is formed at an included angle A of 80 to 82 degrees. It has been determined that in an embodiment of the present invention, increasing the included angle A to 100 degrees as shown in FIG. 5, allows for a head with a shorter height H than standard, and therefore less cutting of the composite material is required to achieve a flush seating of the head.

Figure 3:
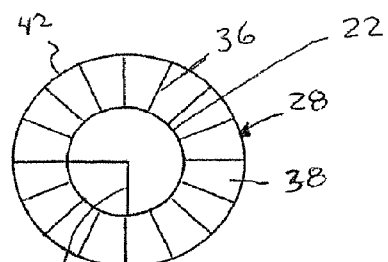
FIG. 3 is an end elevational view of the tip end of the fastener of FIG. 1.
Figure 4:
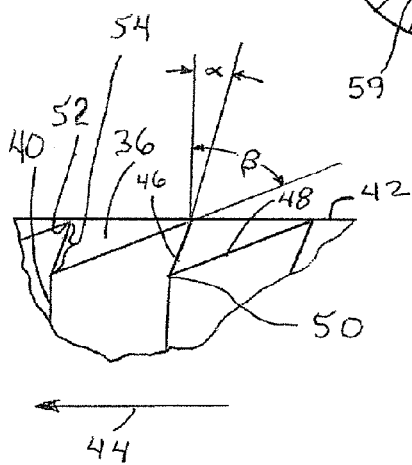
FIG. 4 is an enlarged partial side elevational view of the cutter teeth portion of the fastener of FIG. 1.

In an embodiment as shown in FIGS. 3 and 4, the cutter teeth 36 each comprise a ridge 40 extending radially outwardly from the shank 22 to a peripheral edge 42 of the enlarged head 26. The thread 30 is arranged on the shank 22 so that the fastener 20 is advanced upon a rotation of the fastener around the axis 24 in a first rotational direction 44. Each ridge 40 comprises two side walls 46, 48 angled relative to the axis 24 and meeting at an apex 50. The apex 50 leads the two side walls 46, 48 in the rotational direction 44 of advance of the fastener 20. In the embodiment illustrated, a first 46 of each of the two side walls is on a leading side as compared to a second 48 of the two side walls. The first, leading side wall 46 of each ridge 40 is formed at an angle α from the axial direction 24 which is less than an angle β of the second side wall 48.

As shown in FIG. 4, a radial groove 52 is positioned between each of the ridges 40. In an embodiment, the groove 52 has a greater depth 54 at the peripheral edge 42 of the enlarged head 26 than at the shank 22. In other embodiments, the depth of the groove 52 remains unchanged along its length.

In an embodiment as shown in FIG. 1, a circumferential slot 56 is formed in the shank 22 between an end 58 of the thread 30 and the enlarged head 26. This slot 56 may be formed by forging or by saw cutting, or by other known methods. Since the threaded fastener 20 is typically made of a hard metal material, such as 10B21 boron steel, the slot 56 may be formed by forging or by cutting of the fastener material after the fastener is formed. The final one half to three quarters of an inch of the tip of the fastener may be case hardened, such as by induction heating, to RC 50 to a depth of 0.006 to 0.0011 inches. In some applications, the tip 28 of the fastener 20 may be provided with an axial slot 59 forming a self drilling tip for the fastener.

In an embodiment, a silicone based wax 60 or other heavy wax may be applied to a surface of the fastener, at least in an area of the thread, as discussed in detail below.

Figure 6:
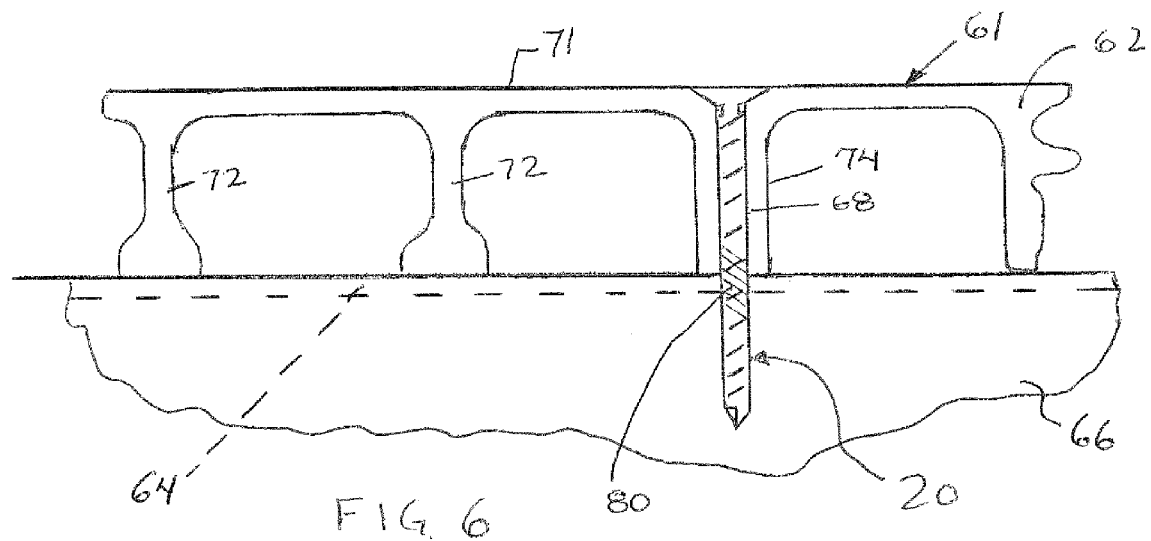
FIG. 6 is a side sectional view of an assembly of the fastener of FIG. 1 with a hard composite non-wood material decking and a metal I-beam.
Figure 7:
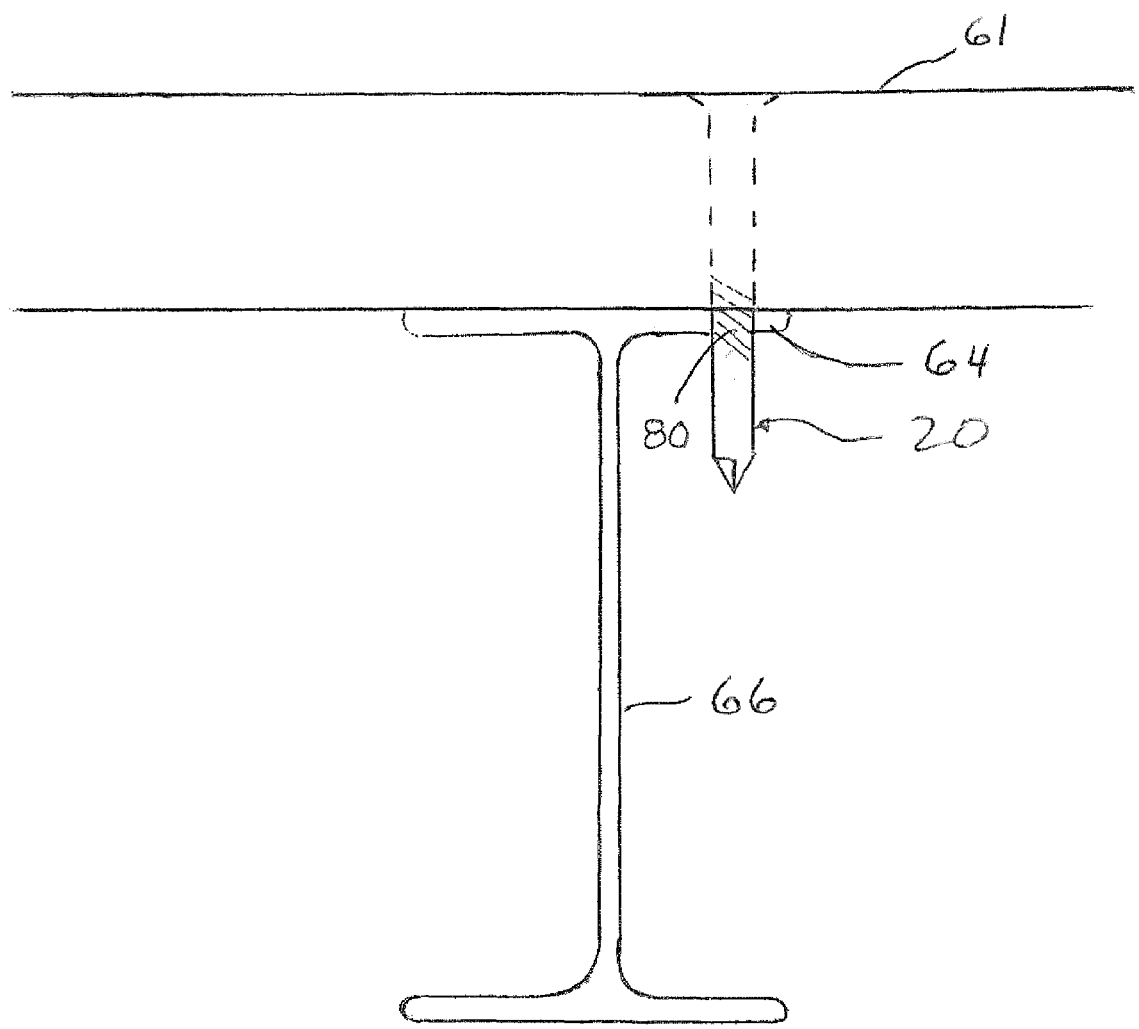
FIG. 7 is a side sectional view of the assembly of FIG. 6, rotated 90 degrees about a vertical axis.

FIGS. 6 and 7 illustrate the fastener 20 fully engaged in a plank 61 of composite flooring material 62 and extending into and through a flange 64 of a supporting metal I-beam 66. The planks 61 typically extend the full length of a semi-trailer body and the I-beams 66 extend side-to-side within the trailer body, spaced about a foot apart from each other. To assist in the correct placement of the fastener 20 for engagement with the composite flooring material 62 and the I-beam 66, a pilot hole 68 (FIG. 8) is provided in the composite flooring plank 61. As seen in FIG. 6, the composite flooring material 62 is preferably formed into the plank 61 with a relatively thin flat top surface 70 and a plurality of downwardly depending ribs 72 that provide stability and strength to the plank. The ribs 72 are supported on the I-beams 66. Certain ribs 74 have a relatively thick width along their entire height to accommodate the diameter of the fasteners 20 that are inserted through those ribs. A typical diameter for the fastener 20 used in this embodiment is 5/16 (0.3125) inches.

To assure proper placement of the fastener 20 relative to the flooring material planks 61 and the supporting I-beam 66, the pilot hole 68 is provided to extend through the center of the relatively thick rib 74 which has a thickness sufficiently greater than the diameter of the fastener so as to provide sufficient support and strength for the fastener. Typically for a threaded fastener with a diameter of 0.3125 inches, a pilot hole would be provided having a diameter of 9/32 (0.281) inches. However, it has been determined that in this particular embodiment, it is advantageous to provide a slightly larger diameter pilot hole 68, for example with a diameter of 0.30 inches, to allow the head 26 of the fastener 20 to drop down slightly more (0.030 inches) into the pilot hole 68 to allow for the cutting operation to begin and to reduce the resistance to the insertion of the fastener through the relatively hard composite material. The pilot hole 68 is not so large as to allow any lateral movement of the composite material plank 61 relative to the fastener. Thus, in an embodiment, the pilot hole 68 has a diameter of no more than 2/100ths of an inch smaller than the diameter of the fastener 20, and no larger in diameter than the diameter of the fastener at the threads.

Figure 8:
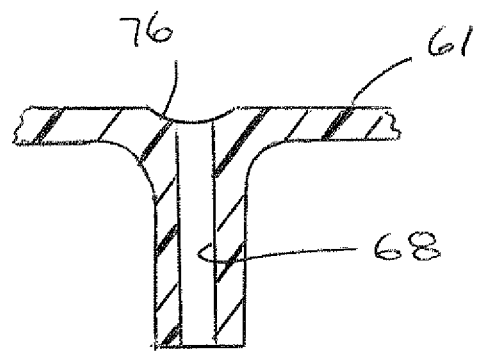
FIG. 8 is a partial side sectional view of the composite material plank of FIGS. 6 and 7.
Figure 9:
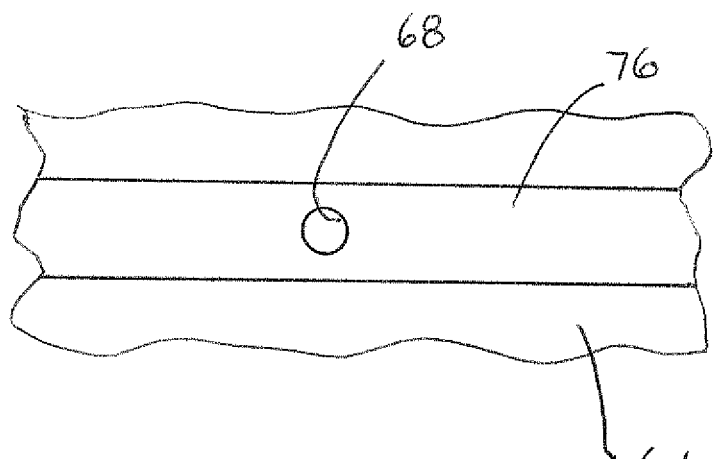
FIG. 9 is a partial top elevational view of the composite material plank of FIG. 8.

In an embodiment, as shown in FIGS. 8 and 9, it may be desirable to form a shallow groove 76 along the length of the top surface 71 of the composite material plank 61 in the area where the pilot holes 68 are located. This groove 76 will allow an assembler to more easily locate the pilot holes 68, and will also reduce the amount of material that is required for the head 26 of the fastener 20 to remove in order for it to seat in a flush manner. The width of the groove 76 can be approximately the same as the diameter of the enlarged head 26 of the fastener 20, and the groove can be formed with a rounded side wall approximating the angle A of the lower surface 38 of the fastener head.

The positions of the pilot holes 68 in the relatively thick rib 74 are arranged such that they will overlie the flange 64 of the various supporting I-beams 66. When the fastener 20 is driven into the composite material, the slot 59 forming the self drilling tip of the fastener will engage with the flange 64 and will drill out the necessary opening for the fastener to threadingly engage with the metal I-beam 66. Although the I-beam 66 is made from a relatively hard metal material, such as cold rolled steel, the fastener 20 needs to only make a single hole through the I-beam flange 64, and thus is required to remain sharp for cutting only this single hole. This is contrasted with current methods of attaching floor decking in truck trailers where electric drills with hardened drill bits are used to make the fastener holes. Those drill bits are required to make multiple holes in the hard steel material of the I-beam flanges, and consequently the drill bits must be changed with a frequency that significantly slows the assembly process and increases the costs due to the large number of hardened drill bits required.

Because, in this embodiment, the composite material plank 61 is not compressive, and therefore does not assist to hold the fastener threads 30 tight against the flange 64 of the I-beam 66, it is useful to apply a nylon lock patch 80 (FIGS. 1 and 7) to that portion of the fastener 20 that will be in engagement with the I-beam flange 64 once the fastener is completely driven into the composite material 62. The nylon patch 80 will provide the gripping function necessary to provide a back out torque for the fastener 20.

It has also been determined that instead of using C-1022 steel wire for the fasteners, as is standard practice, it is an improvement to use a steel that has some boron added to provide a harder fastener. For example, a C-10B21 steel wire provides an improved result in this embodiment. Also, a standard surface hardening is normally RC-45, and it has been found that a surface hardening of the fastener to RC-50 for a depth of 0.006 to 0.10 inches provides an improved result.

In use, the tip 28 of the fastener 20 is placed against the composite flooring material plank 61 and a driving tool is inserted into the driving recess 32 formed in the top surface 34 of the head 26 of the fastener. In some applications, as discussed above, the pilot hole 68 may be provided in the plank 61, and in some applications the tip 28 of the fastener 20 may be provided with the axial slot 59 forming a self-drilling tip for the fastener. In any event, the driving tool causes the fastener 20 to rotate about the axis 24, driving the fastener into the composite flooring material plank 61.

As the shank 22 moves completely into the composite material 62, the cutter teeth 36 on the underside of the head 26 remove the composite material under the head, allowing the head to countersink into the composite material. The removed composite material is moved outwardly in the grooves 52 between the ridges 40 of the cutter teeth 36 as the fastener rotates due to centrifugal force. This will allow most of the removed composite material to be removed from the area under the fastener head 26 at the free open ends of the grooves 52 forming the cutter teeth 36. In those embodiments where the grooves 52 are deeper adjacent the peripheral edge 42 of the head 26, the composite material 62 is removed and displaced more readily.

In those embodiments where there is a circumferential slot 56 just between the head 26 and the threaded portion of the shank 22, any composite material 62 that does not exit from below the head 26 will be captured in the slot so that this removed material will not pack up the threads 30 of the fastener 20 causing it to bind as it is driven into the composite material.

In those embodiments where the nylon lock patch 80 is provided, the nylon lock patch will engage with the flange 64 of the I-beam 66 and will serve to lock the fastener 20 in place relative to the I-beam.

In some embodiments the silicone based wax 60 or other heavy wax is applied to the fastener after plating and after the optional nylon patch 80 is applied to the fastener. The wax 60 is applied at least in the area of the threads 30. As the cutter teeth 36 engage the composite material 62 and the head 22 begins to countersink, the composite material begins to heat and pack up into the voids or grooves 52 of the cutter teeth. The wax 60 helps to lubricate the cutter teeth 36 and allows the packed up composite material 62 to escape from under the fastener head 26.

It is preferred to ensure that the ridges 40 of the cutter teeth 36 extend to the peripheral edge 42 of the enlarged head 26 so that material of the hard composite non-wood material 62 that is removed by the teeth is allowed to be freely displaced radially outwardly as the threaded fastener 20 is rotated into the planks 61, to keep the area between the enlarged head 26 and the decking planks free of removed chips of material as the fastener is drawn into a fully seated position.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A threaded fastener comprising:
    a shank extending along an axis away from an enlarged head to a tip,
    a thread extending in a helix around the shank from the tip of the shank towards the enlarged head,
    a driving recess on a top surface of the enlarged head arranged to receive a tool to allow a driving of the fastener in a rotational manner around the axis of the shank, and
    cutter teeth formed on a lower surface of the enlarged head,
    the cutter teeth each comprising a ridge extending radially outwardly from the shank to a peripheral edge of the enlarged head,
    the thread is arranged on the shank so that the fastener is advanced upon a rotation of the fastener around the axis in a first rotational direction and each ridge comprises two side walls angled relative to the axis and meeting at an apex, the apex leading the two side walls in the rotational direction of advance of the fastener.

2. The threaded fastener of claim 1, wherein a first of each of the two side walls is on a leading side as compared to a second of the two side walls, the first, leading side wall of each ridge being angled from the axial direction less than the second side wall.

3. The threaded fastener of claim 1, wherein a radial groove is positioned between each of the ridges, the groove having a greater depth at the peripheral edge of the enlarged head than at the shank.

4. The threaded fastener of claim 1, wherein a circumferential slot is formed in the shank between an end of the thread and the enlarged head.

5. The threaded fastener of claim 1, including a silicone based wax applied to a surface of the fastener, at least in an area of the thread.

6. The threaded fastener of claim 1, including an axial groove at the tip of the fastener to provide a self-drilling tip.

7. An assembly of a threaded fastener with a hard composite non-wood material decking and a supporting metal I-beam, wherein the threaded fastener comprises:

a shank extending along an axis away from an enlarged head to a tip, a thread extending in a helix around the shank from the tip of the shank towards the enlarged head, a driving recess on a top surface of the enlarged head arranged to receive a tool to allow a driving of the fastener in a rotational manner around the axis of the shank, and cutter teeth formed on a lower surface of the enlarged head, and wherein the hard composite non-wood material decking includes a downwardly depending rib and the fastener is located within the rib.

8. The threaded fastener of claim 7, wherein a pilot hole having a diameter no greater in diameter than a diameter of the threaded shank of the fastener is formed in the rib of the decking.

9. The threaded fastener of claim 8, including a groove formed in a top surface of the decking, with the pilot hole being located in the groove.

10. The threaded fastener of claim 7, wherein the fastener extends through a top flange of the I beam.

* * * * *